United States Patent
Williamson, IV

(10) Patent No.: US 8,984,758 B2
(45) Date of Patent: Mar. 24, 2015

(54) FIREARM HEADSPACE MEASURING GAUGE AND METHOD

(71) Applicant: Long-Shot Products, Ltd., Loveland, OH (US)

(72) Inventor: Warren P. Williamson, IV, Loveland, OH (US)

(73) Assignee: Long Shot Products, Ltd., Loveland, OH (US)

( * ) Notice: Subject to any disclaimer, the term of this patent is extended or adjusted under 35 U.S.C. 154(b) by 146 days.

(21) Appl. No.: 13/803,135

(22) Filed: Mar. 14, 2013

(65) Prior Publication Data

US 2014/0196300 A1    Jul. 17, 2014

Related U.S. Application Data

(60) Provisional application No. 61/752,155, filed on Jan. 14, 2013.

(51) Int. Cl.
  *G01B 5/18* (2006.01)
  *G01B 3/28* (2006.01)

(52) U.S. Cl.
  CPC ............................. *G01B 3/28* (2013.01)
  USPC ................................... 33/506; 33/542

(58) Field of Classification Search
  USPC ............................. 33/506, 531, 542, 832, 836
  See application file for complete search history.

(56) References Cited

U.S. PATENT DOCUMENTS

| | | | |
|---|---|---|---|
| 2,553,704 A | 5/1951 | Eckel | |
| 2,668,360 A | 2/1954 | Keller | |
| 3,209,461 A | 10/1965 | Wilson | |
| 3,510,951 A | 5/1970 | Dow | |
| 3,641,869 A | 2/1972 | Buchanan et al. | |
| 4,447,975 A | 5/1984 | Ljutic | |
| 4,918,825 A * | 4/1990 | Lesh et al. | 33/506 |
| 5,233,124 A * | 8/1993 | Peterson | 33/506 |
| 5,361,505 A * | 11/1994 | Faughn | 33/506 |
| 5,546,667 A * | 8/1996 | Thalhammer | 33/506 |
| 5,570,513 A * | 11/1996 | Peterson | 33/506 |
| 6,718,645 B2 | 4/2004 | Berger | |
| 7,716,845 B1 * | 5/2010 | Willis | 33/506 |
| 7,913,410 B2 * | 3/2011 | Monturo | 33/506 |
| 2010/0122468 A1 * | 5/2010 | Willis | 33/506 |
| 2013/0219728 A1 * | 8/2013 | Hartman | 33/506 |

OTHER PUBLICATIONS

M.L. McPherson, Getting Consistent Ideal Headspace When Full-Length Resizing, Article, pp. 134-140, 2013.

Armalite, Inc., Technical Note 60: Measuring Headspace, May 12, 2010 Rev 2, 2004.

Frank Brownell, Gunsmith Kinks 4, Article, 2001.

(Continued)

*Primary Examiner* — G. Bradley Bennett

(74) *Attorney, Agent, or Firm* — Wood, Herron & Evans, L.L.P.

(57) ABSTRACT

A gauge for measuring the headspace dimension of a firearm chamber. The gauge includes a first member coupled to a second member in a telescopic fashion. The first and second members may be positioned in an open firearm chamber. With the firearm chamber subsequently closed, the first and second members are moved into a position that gives the actual headspace dimension and locked in that position. The gauge may then be removed from the chamber and measured to give the user the actual headspace dimension.

10 Claims, 4 Drawing Sheets

(56) References Cited

OTHER PUBLICATIONS

Manthei Mess Systeme, Universal Headspace and Chamber Depth Gauge, www.manthei-mess-systeme.com/gb_headspace_Gauge.htm, 8 pgs. Apr. 1, 2013.

American National Standards Institute (ANSI), Voluntary Industry Performance Standards for Pressure and Velocity of Centerfire Rifle Sporting Ammunition for the Use of Commercial Manufacturers, ANSI/SAAMI Z299.4-1992.

* cited by examiner

FIREARM HEADSPACE MEASURING GAUGE AND METHOD

CROSS-REFERENCE TO RELATED APPLICATION

This application claims the priority of Application Ser. No. 61/752,155 filed Jan. 14, 2013 (pending), the disclosure of which is hereby incorporated by reference herein.

TECHNICAL FIELD

The present invention generally relates to accurately measuring the headspace of a firearm chamber. For a rifle cartridge, the headspace is defined as the distance from the bolt face at battery position to a known datum point in the chamber.

BACKGROUND

Firearms are inherently dangerous devices. A controlled violent explosion happens every time the trigger is pulled. Only by careful control of propellant charges, tolerances of manufacture, and strength of materials can they be made safe to handle and use. When reloading spent cartridges there are many ways to make errors that can have negative consequences. Therefore it is extremely important to know that all of the critical parameters are within specifications. One such specification is that of the chamber size which receives the loaded cartridge. If the chamber is too small the cartridge may jam and ignite without the bolt fully closed. If the chamber is to large, explosive gasses will escape around the cartridge and be expelled toward the user. The firearms industry relies on a rigorous set of specifications for chamber dimensions and corresponding loaded ammunition. These dimensions are known as the SAAMI specifications or "SAAMI specs". SAAMI stands for the SPORTING ARMS AND AMMUNITION MANUFACTURING INSTITUTE INC. Therefore, in theory if a firearm is manufactured with the proper size chamber all commercially available cartridges will fit in the chamber properly.

For each different firearm cartridge size, there are a set of SAAMI specifications for the firearm chamber and cartridge. While there are many dimensions that describe the size of a firearm cartridge, headspace is one that governs how the loaded cartridge fits into the chamber lengthwise when the bolt is locked into a battery or closed position. Battery refers the position of the bolt when the locking lugs of the firearm bolt or breach end of the chamber are closed and locked ready to fire. Because of manufacturing tolerances there is always some clearance in the fore/aft position of the breach locking lugs. Because the locking lugs are under spring tension from the firing pin assembly, they may not be held all the way against the aft surfaces which would define the largest closed bolt chamber dimension.

To help understand aspects of this description, the cartridge ignition process will now be discussed. A loaded cartridge is placed in the chamber of firearm. The bolt is in most cases moved forward pushing the cartridge into the chamber of a firearm such as, but not limited to, a rifle. The bolt is locked, usually by closing a handle. Once the trigger is pulled a spring urges the firing pin forward to strike the primer at the rear of the cartridge. The firing pin impact ignites the powder charge inside the cartridge. The release of the firing pin also releases spring tension on the locking lug surface holding the cartridge into the chamber. If there is any clearance or space between locking lugs of the bolt and the action retaining surfaces, the locking lugs will most likely jump rearwardly until they come to the hard stop of the action or breach. When the primer ignites the powder charge, the explosion expands inside the cartridge forcing the walls of the brass cartridge out against the walls of the firearm chamber until the cartridge can no longer expand because the cartridge is fully supported by the steel of the chamber and bolt face. In addition to radial expansion there is longitudinal expansion and movement. With no place else to go, expanding gases force the bullet out through the bore of the firearm. Before that happens, however, the expanding gases push the bullet forward towards the muzzle and push the brass case rearward against the bolt face. As the case moves rearward pushing on the bolt face and retaining lugs, it will take up any tolerances or space in the bolt lug interface with the action. This movement or jumping of the cartridge between ignition and expulsion of the bullet detracts significantly from the accuracy of a firearm. For example, if one cartridge is short and has to expand a long way before releasing the bullet, that bullet will have a different downrange point of impact than a bullet that is released from a properly sized cartridge.

In a perfect world the brass cartridge would be sized exactly to the fully expanded chamber size so that the brass cartridge does not jump or move around inside the chamber during the firing cycle. Because of manufacturing tolerances it is impossible to make every chamber of every firearm the same size. It is also impossible to make all cartridges of a particular type the same size. Due to manufacturing tolerances one must always have a slightly smaller cartridge than the chamber or else cartridges having lengths on the longer side of the tolerance will be too long to fit in the chamber. Therefore, cartridges are manufactured slightly undersized so that they will fit in even the smallest chamber size allowed by the SAAMI specs. A headspace gauge of the invention may be used, for example, for ammunition known as bottleneck cartridges most commonly used in long arms known as a rifle. The name bottleneck cartridge comes from the fact that there is a rather large case which holds the powder, and a shoulder on the case which has a frustoconical shape tapering to a cylindrical neck which holds the bullet in place at the end of the cartridge. SAAMI has determined that the best place to determine the overall length or headspace of a firearm chamber is at an imaginary datum diameter in contact with the shoulder of the cartridge. Therefore, the headspace is measured from the base of the cartridge to the datum circle on the shoulder. The reason SAAMI uses a predetermined datum diameter is that brass cartridges must have radiused edges to prevent stress cracking. Because different wall thicknesses will produce different radii it would be very difficult to determine headspace at an intersection point between walls and angled shoulders.

Those who strive for exceptional accuracy rely on custom sizing their brass cartridges to be certain that the cartridges that they make their loaded ammunition from are sized perfectly for the firearm chamber in which they will be used. Because factory made ammunition must be made to fit in every chamber, it cannot possibly have the accuracy of ammunition sized perfectly for a specific chamber. Therefore, those interested in accurate ammunition with exact tolerances must take steps to properly size the cartridges in dies during the reloading process. A gauge of this invention may, for example, be used by those who reload (shape the cartridge in a die) their own ammunition and need to know the exact true headspace of the firearm chamber in which they will make the most accurate cartridge case for that particular chamber.

As used herein, the term "true headspace" or "actual headspace" refers to the dimension measured from a closed chamber when all parts which define the chamber dimension have been expanded to their physical limits. Currently, there is no practical way to tell what the "true headspace" dimension of a chamber is because the chamber is inaccessible (other than through the bore of the firearm) when the bolt is closed. This is a very important distinction because the current practices to attempt to obtain this dimension are either very difficult to perform or give inferred measurements. The most common way to approximate the headspace is by measuring brass cases which have been fired in the chamber in question. This method has drawbacks, and most people are unaware that these drawbacks obtain incorrect results.

Currently, most reloaders measure a fired brass case to determine headspace. This practice is inaccurate for the following reasons. When a brass cartridge is fired the brass case expands radially outward to the chamber wall of the firearm and then retracts a bit due to the elastic limit the brass. The amount it retracts is related to the elastic limit and hardness of the brass. If a brass case has been fired several times it will work harden and spring inwardly away from the chamber wall more than a cartridge that is annealed prior to firing. Excessive explosive forces from loading high pressure or magnum loads can also stretch the brass and make it too long for the chamber. To make reloaded brass fit the chamber properly so that the bolt can be closed easily every time, it needs to be forced into a shape forming die to restore its shape to fit the chamber every time. Those interested in accuracy will anneal their cartridges with a carefully applied flame heat. This allows the brass cartridge to be resized during the reloading process by forcing it into a reloading die to shape the cartridge to the correct headspace. The problem is very few people will anneal each brass case prior to reloading. For example, an annealed case may only shrink back one or two thousands of an inch from the chamber. A cartridge that has been fired multiple times and is work hardened may shrink back 0.006 inch. For users with several brass cases, and various numbers of firings among the lot, it would be very hard to tell what the headspace is by measuring fired brass. This is one of the problems the invention solves by measuring the chamber and not the brass.

Most people who reload will have brass with different numbers of firings on the brass. This sets up an additional problem where amongst the population of brass cases which are going to be resized there can be many different brass hardness levels amongst the case population. This results in cases which come out of the die at different dimensions solely based on the brass hardness. The only way to get all the brass to be the same dimension is to anneal the cases prior to resizing. Therefore, the custom made properly sized cartridge which has been annealed and reshaped in a die will fit precisely in the chamber.

One current method of approximating headspace is to purchase a set of so-called Go, No-Go gauge pins. One gauge is too long and the other is too short for the specific chamber size of the firearm. In order to determine if the chamber is in specification one installs the Go gauge and makes certain that the bolt can be closed on that gauge. If the bolt closes, the chamber is long enough to accept the longest SAAMI spec ammunition cartridge. One then installs the No-Go gauge and the bolt should not be able to be closed. If the bolt closes, the chamber is too long. However, one never really knows what the dimension of the chamber is between the Go and No-Go gauge. One only knows that it is within the short and long limits. One can make a metal cast of the chamber with a special fixturing metal. The metal melts at a low temperature (~160° F.) and can be poured into the chamber, allowed to cool and then removed. The problem here is that half of the headspace dimension is in the bolt face, the other half is in the barrel chamber. And there is no way to take into account the bolt lug clearance. So if you extract the cast of the portion of the chamber in the barrel you still need to figure out how much is in the bolt face and where the interface is between the chamber and bolt recess. This method also does not push the bolt locking lugs into their battery position against the aforementioned spring tension. On the other hand, using the brass measurement technique one encounters a whole new set of problems. Brass is a material which work-hardens. That means that as the material is stressed it changes properties. One of those properties is ductility. Therefore, if a brass cartridge is fired many times it will be harder and less ductile than one which is fired from an annealed state. This fact is lost on most people who measure brass cartridges to determine headspace in the chamber. Tools are currently sold which attach to off-the-shelf vernier calipers to measure headspace from a fired brass cartridge. To determine the headspace on a fired brass case one attaches a cylinder with a known inside diameter equal to the datum diameter used to measure the headspace.

Based on the summary of the procedure provided above, it will be appreciated that there is a need for a device that measures the true headspace of a chamber when the bolt is closed.

SUMMARY

In one illustrative embodiment, a gauge for measuring the headspace dimension of a firearm chamber is provided. The gauge comprises a first member coupled to a second member in a telescopic fashion. The first and second members may be positioned in an open firearm chamber and, with the firearm chamber subsequently closed, the first and second members are capable of being moved to the actual headspace dimension and locked in position at a length equaling the actual headspace dimension. The gauge may then be removed from the chamber and measured to give a user the actual headspace dimension.

In another aspect, a method for measuring the headspace dimension of a firearm chamber is provided. The method comprises coupling a first member to a second member in a telescopic fashion to form a gauge. With the first and second members positioned in a closed firearm chamber, the first and/or second members are moved to the actual headspace dimension of the chamber. The gauge is removed from the chamber, and is measured to give a user the actual headspace dimension.

Various additional features and advantages of the invention will become more apparent to those of ordinary skill in the art upon review of the following detailed description of the illustrative embodiments taken in conjunction with the accompanying drawings.

DETAILED DESCRIPTION OF THE ILLUSTRATIVE EMBODIMENTS

One embodiment of a headspace gauge (not shown) comprises a case which engages the bolt face and has an interior threaded bore. A datum plunger has an exterior threaded stem that threadingly engages the threaded bore of the gauge case. The plunger also has a proper datum face for engaging the conical surface of the firearm chamber's shoulder. A driving tool engagement element, e.g., a recess, is included in the tip of the plunger for access through the bore of the firearm, such as through the exit of a rifle bore. A very long driving element would engage the plunger tip through the bore. In use, the two part threaded gauge would be inserted into the chamber of a rifle, for example, and the long driving element passed down the bore to engage the plunger. The driving element is rotated, like a screwdriver, which unscrews the plunger in the threaded case up to the point where it stops against the datum surface of the chamber. The two practical drawbacks here are that it will require a very long special driver which needs to be passed down the bore, and that if one rotated the driver too much there could be an enormous exerted force on the locking lugs of the bolt. This force could be so large that the bolt could not be opened again. If one broke off the driver or the driving interface (engagement element) such as a hex key or slot were to become damaged with the gauge in place the gun would have to be disassembled by a gunsmith to remove the gauge. While there could be torque limiting mechanisms in the driver handle to alleviate this problem these all become expensive modifications or complications and are not ideal.

Figure 2A:
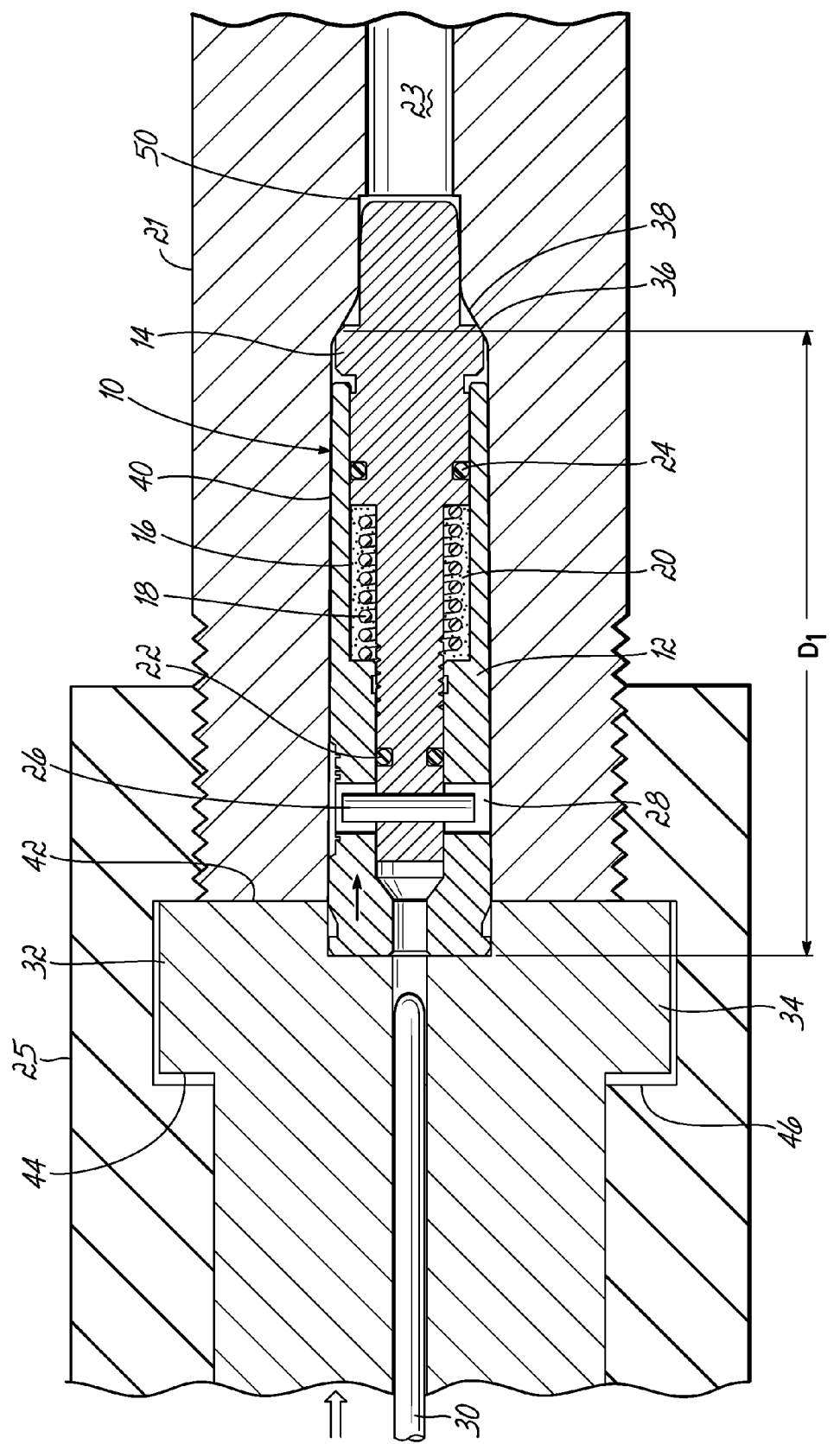
FIG. 2A is a longitudinal cross sectional view showing the components of FIG. 1 assembled with the headspace gauge in the chamber prior to pulling the trigger of the firearm and releasing the firing pin.
Figure 2B:
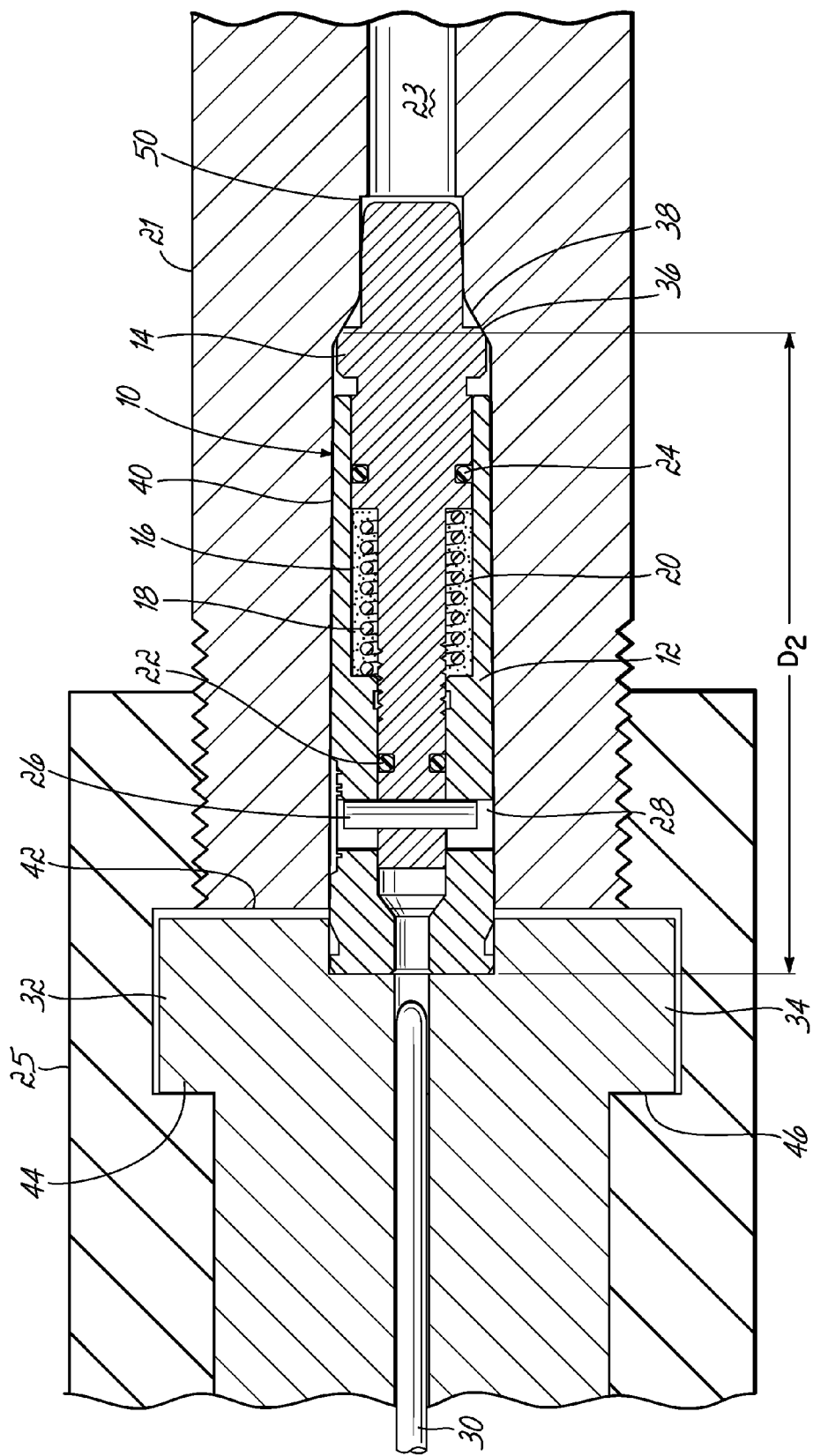
FIG. 2B is a cross sectional view similar to FIG. 2A, but illustrating the position after the trigger of the firearm has been pulled and the firing pin has been released.
Figure 3:
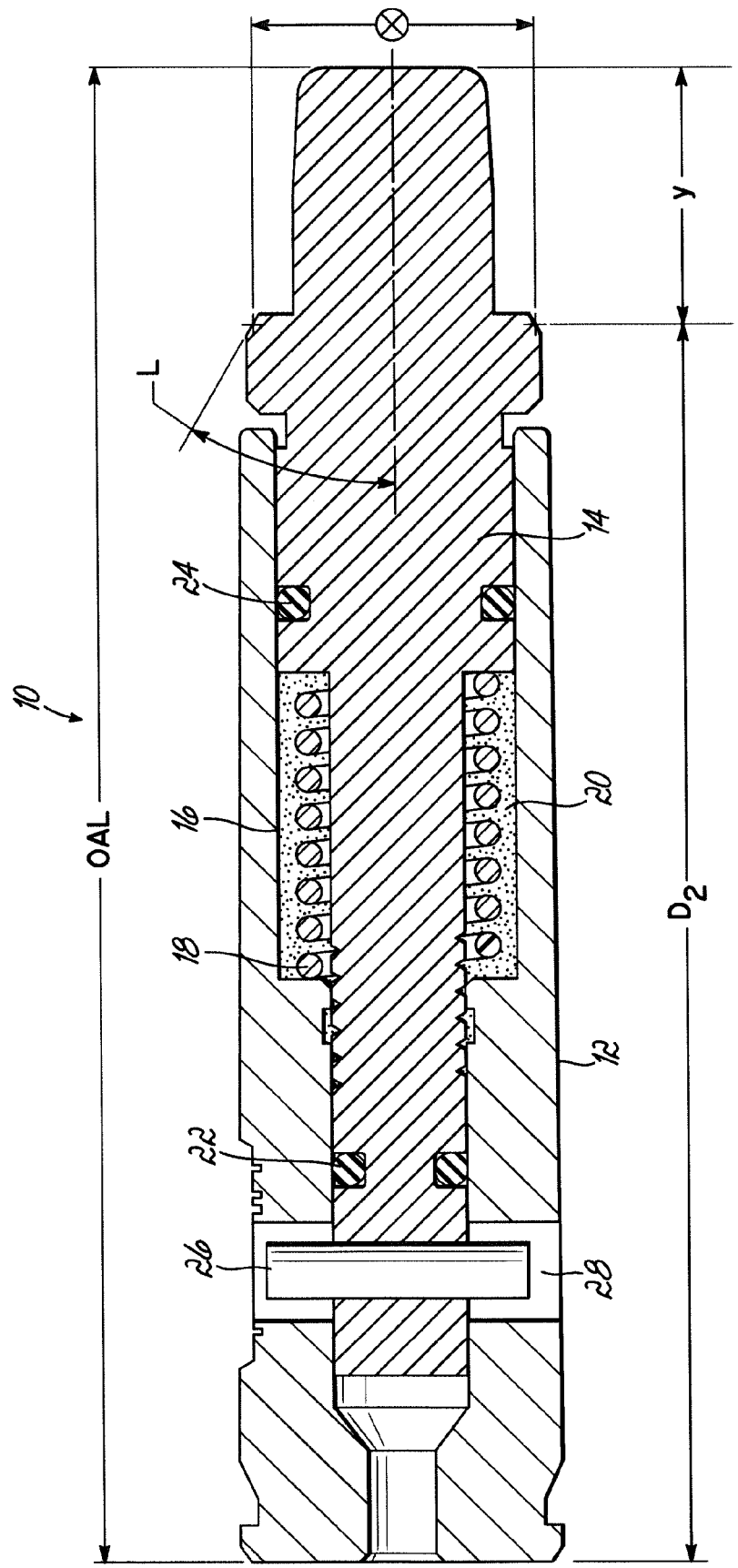
FIG. 3 is a cross sectional view of the headspace gauge after removal from the firearm chamber.

A simple tool which is easy to use and can be reused many times is much more desirable. The preferred embodiment of a headspace gauge 10 is made of four primary parts, shown in FIG. 1. A cylindrical case 12, receives an elongated cylindrical plunger 14 in telescoping fashion. As shown in FIGS. 2A, 2B and 3, an interior space 16 is defined between the plunger outside diameter and the case inside diameter. This space 16 receives a compression spring 18 and a phase changeable locking substance 20 (FIGS. 2A, 2B, 3). In the preferred embodiment, the locking substance is made from 60% IGI® 1239A and 40% Vybar 260. IGI® 1239A is a fully refined wax available from The International Group, Inc., Titusville, Pa. Vybar 260 is a polymer available from Baker Hughes, Barnsdall, Okla. Two O-rings 22, 24 prevent the leakage of the locking substance 20 from the interior space 16. A portion of a firearm barrel 21 with a firing bore 23 is also shown, and threads into another portion 25 of the firearm. A retaining pin 26 is installed in the plunger 14 and in a slot 28 in the wall of the case 12 to couple the case 12 to the plunger 14 for limited lengthwise relative movement.

To use the gauge 10 it is subjected to a heat source high enough to melt the locking substance 20 in the interior space 16 of the gauge 10. If the locking substance 20 melts below 212° a hot water bath can be used to bring the gauge 10 up to temperature and melt the locking substance 20. When the locking substance is heated and molten the spring 18 will be "unlocked" and urge the case 12 and plunger 14 to their outermost length defined by the slot 28 and pin 26. This starting distance is about 0.040" longer than the longest SAAMI chamber dimension so that the gauge 10 will always be compressed in a closed chamber. Once heated, the gauge 10 is inserted into the firearm chamber, the trigger of the firearm is released to allow the spring pressure associated with the firing pin 30 to release any force on the bolt locking lugs 32, 34. The internal spring 18 forces the plunger 14 forward into contact with the datum 36 on the shoulder 38 of the firearm chamber 40 and in turn forces the case 12 of the gauge 10 back against the bolt face 42 of the firearm. The bolt lugs 32, 34 are further urged back to their stops 44, 46 in the action by the internal spring 18 just as a cartridge would expand rearward when fired. Because the steel of the chamber is colder than the heated gauge 10 the gauge 10 will cool off. When it cools the locking substance 20 inside the gauge 10 hardens and causes the case 12 and plunger 14 to be locked together as a single unit holding the two main parts 12, 14 of the gauge 10 at the true headspace dimension. When cooled, the gauge 10 is removed from the chamber 40 and $D_2$ is measured with the same tools used to measure fired brass cartridges. The gauge will stay at the cold measured dimension until the locking substance 20 is again heated above its melt temperature. Internally, the locking substance 20 prevents the plunger 14 from sliding relative to the case 12 as if they were glued together. The gauge 10 can be used over and over because the locking substance 20 can be re-melted and reused. The O-rings 22, 24 keep locking substance 20 inside gauge 10. The gauge 10 is simply reheated above the melt temperature of the locking substance 20, and installed into a firearm chamber to cool. A locking substance should be chosen carefully to be certain that any thermal expansion of the locking substance 20 does not affect the overall length of the gauge 10 after cooling. Substances can include waxes, plastics and even very low melting temperature metals. Fixturing alloys which melt at 168° can also be used. It is desirable to have a locking substance which melts at less than 200° and solidifies above about 150°. Other locking substances that do not rely on temperature to change phases may instead be used.

Figure 1:
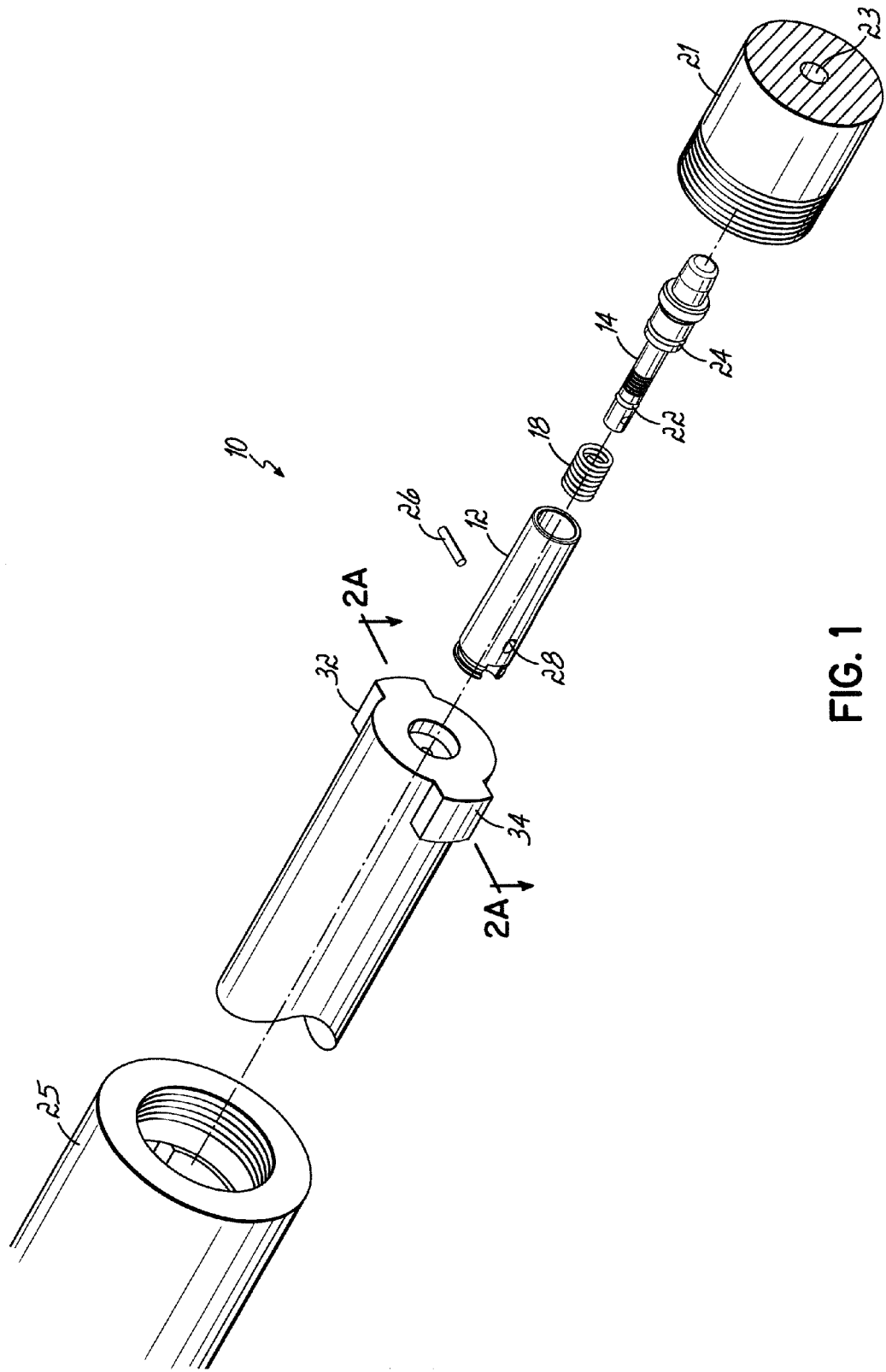
FIG. 1 is an exploded perspective view showing the headspace gauge and components associated with a firearm chamber.

By way of summary, FIG. 1 is an exploded perspective view illustrating the components of the gauge 10 as they would be received in a firearm chamber (not shown) and between other components of a rifle. FIG. 2A is a cross sectional view taken generally along line 2A-2A of FIG. 1 and illustrating the gauge 10 assembled and in position within the rifle chamber 40, with the trigger of the rifle not yet pulled. This gives a dimension $D_1$ between the base of the gauge 10 and the so-called SAAMI datum circle. FIG. 2B is a cross sectional view similar to FIG. 2A, but illustrating the gauge 10 after the trigger has been pulled and the locking lugs 32, 34 have moved to the position shown. This telescopically extends the two main components of the gauge 10, i.e., the case 12 and the plunger 14, and forms a new dimension $D_2$. This new dimension $D_2$ is the actual headspace dimension and will be subsequently measured after the locking substance 20 has locked the gauge at the dimension $D_2$ by solidifying. FIG. 3 is a similar cross sectional view of the gauge 10 itself and illustrates the gauge at the $D_2$ dimension, i.e., the dimension for measuring the actual headspace length or dimension. This dimension may be measured by actually measuring $D_2$ itself using an appropriate measuring device. Or, for example, the overall length "OAL" of the gauge may be easily measured and a known distance "y" may be subtracted to then arrive at $D_2$, or the headspace dimension. The shoulder L is formed on the plunger 14 to correspond precisely with a particular size/type of ammunition. Therefore, it will be appreciated that different gauges 10 will be manufactured to correspond respectively with different sizes/types of ammunition. Further, the nose of the gauge can be made interchangeable so as to measure the overall length from the base to the end of the neck of the cartridge instead of the headspace 50. A longer nose piece is used to extend into the neck area of the chamber without the gauge touching the headspace datum. The reloader uses this length to determine how long to trim the necks when they become stretched after repeated firings. Additionally, a bullet-shaped nose piece can be interchanged to measure bullet seating depth into the barrel rifling. This is used to determine how deep to seat the bullets into the case neck when reloading.

While the present invention has been illustrated by a description of several embodiments, and while such embodiments have been described in considerable detail, there is no intention to restrict, or in any way limit, the scope of the appended claims to such detail. Additional advantages and modifications will readily appear to those skilled in the art. Therefore, the invention in its broadest aspects is not limited to the specific details shown and described. The various features disclosed herein may be used in any combination necessary or desired for a particular application. Consequently, departures may be made from the details described herein without departing from the spirit and scope of the claims which follow. What is claimed is:

What is claimed is:

1. A gauge for measuring the headspace dimension of a firearm chamber, the gauge comprising:
   a first member coupled to a second member in a telescopic fashion, wherein the first and second members may be positioned in an open firearm chamber and, with the firearm chamber subsequently closed, capable of being moved to the actual headspace dimension and locked in position at a length equaling the actual headspace dimension, whereby the gauge may then be removed from the chamber and measured to give a user the actual headspace dimension.

2. The gauge of claim 1, wherein the first and second members are spring biased into a lengthened condition and may be moved against the spring bias to the actual headspace dimension.

3. The gauge of claim 2, further comprising a locking substance acting on the first and second members to lock the first and second members at the actual headspace dimension against the spring bias.

4. The gauge of claim 3, wherein the locking substance is capable of being activated into a fluid condition to allow movement of the first and second members, and further capable of being solidified so as to lock the first and second members at the actual headspace dimension.

5. A method for measuring the headspace dimension of a firearm chamber, the method comprising:
   coupling a first member to a second member in a telescopic fashion to form a gauge,
   with the first and second members positioned in a closed firearm chamber, moving the first and/or second members to the actual headspace dimension of the chamber,
   removing the gauge from the chamber, and
   measuring the gauge to give a user the actual headspace dimension.

6. The method of claim 5, wherein moving the first and/or second members to the actual headspace dimension further comprises moving the first and/or second members against a spring bias.

7. The method of claim 6, further comprising:
   using a locking substance to lock the first and second members at the actual headspace dimension.

8. The method of claim 7, further comprising:
   changing the locking substance from a fluid condition allowing the first and/or second members to be moved to the actual headspace dimension into a solidified condition so as to lock the first and second members at the actual headspace dimension.

9. The method of claim 8, further comprising:
   using heat to change the locking substance to the fluid condition, and cooling the locking substance until achieving the solidified condition prior to removing the gauge from the chamber.

10. The method of claim 5, further comprising:
    using a tool through the firing bore of the firearm to move the first and/or second members to the actual headspace dimension.

* * * * *